(12) United States Patent
Wakiyama et al.

(10) Patent No.: US 6,388,249 B2
(45) Date of Patent: May 14, 2002

(54) SURFACE ANALYZING APPARATUS

(75) Inventors: Shigeru Wakiyama, Chiba; Naohiko Fujino, Tokyo, both of (JP)

(73) Assignees: Seiko Instruments Inc.; Mitsubishi Denki Kabushiki Kaisha, both of (JP)

( * ) Notice: Subject to any disclaimer, the term of this patent is extended or adjusted under 35 U.S.C. 154(b) by 0 days.

(21) Appl. No.: 09/878,869

(22) Filed: Jun. 11, 2001

Related U.S. Application Data

(62) Division of application No. 09/201,182, filed on Nov. 30, 1998, now Pat. No. 6,259,093.

(30) Foreign Application Priority Data

Dec. 1, 1997 (JP) ............................................. 9-330064

(51) Int. Cl.$^7$ ............................. H01J 3/14; H01J 40/14; H01J 5/16
(52) U.S. Cl. ..................... 250/234; 250/306; 356/237
(58) Field of Search ................................. 250/234, 306, 250/235, 307; 356/237

(56) References Cited

U.S. PATENT DOCUMENTS

| | | | | | |
|---|---|---|---|---|---|
| 4,734,578 A | * | 3/1988 | Horikawa | .................. | 250/234 |
| 5,813,987 A | * | 9/1998 | Modell et al. | .............. | 600/473 |
| 6,072,625 A | * | 6/2000 | Kitahara et al. | ............ | 359/388 |
| 6,212,292 B1 | * | 4/2001 | Soares | ........................ | 382/141 |

* cited by examiner

*Primary Examiner*—John R. Lee
*Assistant Examiner*—Johnnie L Smith, II
(74) *Attorney, Agent, or Firm*—Adams & Wilks

(57) ABSTRACT

It is so adapted that a sample is mounted on three-dimensional stages through a sample holder and a beam light emitted from a beam light oscillator is applied to a sample surface through a polarizing element different from polarization of the beam light or directly. An image of a foreign-matter on the sample surface scattered by the beam light is displayed on a monitor through a polarizing element different from the beam light, through a CCD camera mounted on an optical microscope. As a method of bringing the beam light until it is applied to the sample surface, there are a method of using an optical fiber for the beam light and a method of using an optical part such as a mirror.

12 Claims, 3 Drawing Sheets

SURFACE ANALYZING APPARATUS

RELATED APPLICATION

The present application is based on prior U.S. application Ser. No. 09/201,182, filed on Nov. 30, 1998, now U.S. Pat. No. 6,259,093, which is hereby incorporated by reference, and priority thereto for common subject matter is hereby claimed.

BACKGROUND OF THE INVENTION

The present invention relates to a system in which a function of being capable of specifying position of microscopic foreign-matter and defect existing on a sample surface is added to a probe microscope such as an interatomic force microscope or a magnetic force microscope.

The interatomic force microscope which is one kind of probe microscopes has been expected as novel means for observing surface geometries of insulating substances and studies thereon have been advanced since it was invented by G. Binning, et al. who are inventors of STM (*Physical Review Letters, vol.* 56, p930, 1986). In its principle, an interatomic force acting between a detecting tip having a fully sharpened front end and a sample is measured as displacement of a spring element to which the detecting tip is attached and the sample surface is scanned while keeping the displacing amount of the spring element constant, and a control signal for maintaining the displacing amount of the spring element is made a geometric information, thereby measuring a geometry of the sample surface.

As to the displacement detecting means having a spring means, it is roughly divided into an STM system using tunnel current ad ann optical system. The STM system uses so-called tunnel phenomenon wherein electric current begins to flow when voltage is applied to two conductors placed close to a distance of several nano-meters to several angstroms. With the spring element previously given of conductivity, a sharpened metal needle is approached to the spring element to approximately 1 nano-meter and tunnel current is made flow, thereby performing a control with its current value being made a displacement signal of the spring element.

As to the optical system, there are reported an example in which so-called interference method itself is used (*Journal of Vacuum Science Technology* A6(2), p.266, March/April 1988) and an example called an optical-lever system in which a laser light is applied to a spring element and a positional deviation of its reflected light is detected by an optical detecting element, thereby making it a displacement signal (*Journal of Applied Physics* 65(1), 1, p.164, January 1989).

The probe microscope is called an interatomic force microscope if it is one in which a probe placed at a position facing a sample is subjected to interatomic force, and it is called a magnetic force microscope if it is one in which the probe is subjected to magnetic force and, in this manner, it can observe state of the sample by detecting various forces occurring from the sample.

The probe microscope is provided with a detecting section having so high sensitivity that can in performance distinguish differences in interatomic geometry and the like. Therefore, it is deemed to be an effective instrument for easily obtaining sub-micron geometric observation, particularly geometric information in depth direction (Z-axis direction).

In semiconductor field, it has been used for observing wafer surfaces with the miniaturization of devices. As a wafer surface observation, while there is observation of surface roughens, a necessity of observing geometry of foreign-matter on the wafer, which is finer than that existing hitherto. In particular, with SEM (scanning electron microscope) there is difficulty in distinguishing crystal defects on a wafer due to difficulty in obtaining high contrast because a sample surface and the crystal defect is of the same ingredient (silicon). Also, with respect to this point, the probe microscope can provide easy observation having high contrast.

On the other hand, there is a foreign-matter inspecting apparatus utilizing laser light as an apparatus for detecting position of microscopic sub-micron foreign-matter from a broad wafer surface. Further, as means for implanting positional information of foreign-matter on a wafer surface obtained by a foreign-matter inspecting apparatus onto stage coordinates of probe microscope side, there is a method wherein a computer is used to link the foreign-matter inspecting apparatus with stage coordinates of a probe microscope, and thereafter a laser light is applied to surrounding of a sample surface on which foreign-matter or defect would exist, and the scattered light generated by the foreign-matter or defect is detected by an optical microscope system in which a CCD camera is built in, thereby performing a positional correction (Japanese Patent Unexamined Publication No. H08-29354).

In a method of performing a positional correction by means of confirming, using an optical microscope system in which a CCD camera is built in, an image scattered by the fact that a laser light is applied to a sample surface and the laser light hits the foreign-matter, there is no problem as to one in which no pattern is formed on a wafer in the sample surface, mainly in the wafer surface because only the foreign-matter causes scattering to the beam light but if there is formed a pattern, scattering occurs in the pattern, so that it becomes difficult to distinguish the foreign-matter from the scattered light.

Therefore, it is an object of the present invention to provide a probe microscope having a constitution provided with means, which makes it possible to easily detect position of a foreign-matter, by constituting means for detecting scattered light due to the foreign-matter without attenuating it and limitlessly weakening only the scattered light due to a pattern, even if there is the pattern on a wafer, in the scattered light when a laser light is applied.

SUMMARY OF THE INVENTION

The present invention reduces a scatted light component due to a pattern by having a constitution in which polarizing elements are incorporated in a side of the laser light applying system and a side of the optical microscope.

In the present invention, since a pattern on a wafer, which is one constituted by adopting the above means, is formed in a constant direction, a scattered state becomes constant with respect to a laser light having a constant polarization and the laser light is scattered with its scattering direction becoming constant as well. Accordingly, it is possible to reduce the scattered light due to the pattern by incorporating a polarizing element whose scattering direction is different from the scattered light due to the pattern in a side of the optical microscope, which is a side at which a scattered image is observed. On the other hand, foreign-matter has no particular directionality, so that the scattered light due to the foreign-matter has less polarization component. Consequently, the scattered light due to the foreign-matter is not greatly influenced by the polarizing element provided on the optical microscope side. By this, it is possible to easily confirm only a scattered image due to the foreign-matter. By this, it becomes possible to confirm a position of the foreign-matter of a sub-micron level even on the wafer on which the pattern has been formed, so that it becomes possible to perform an observation with a probe microscope.

DETAILED DESCRIPTION OF THE INVENTION

Figure 1:
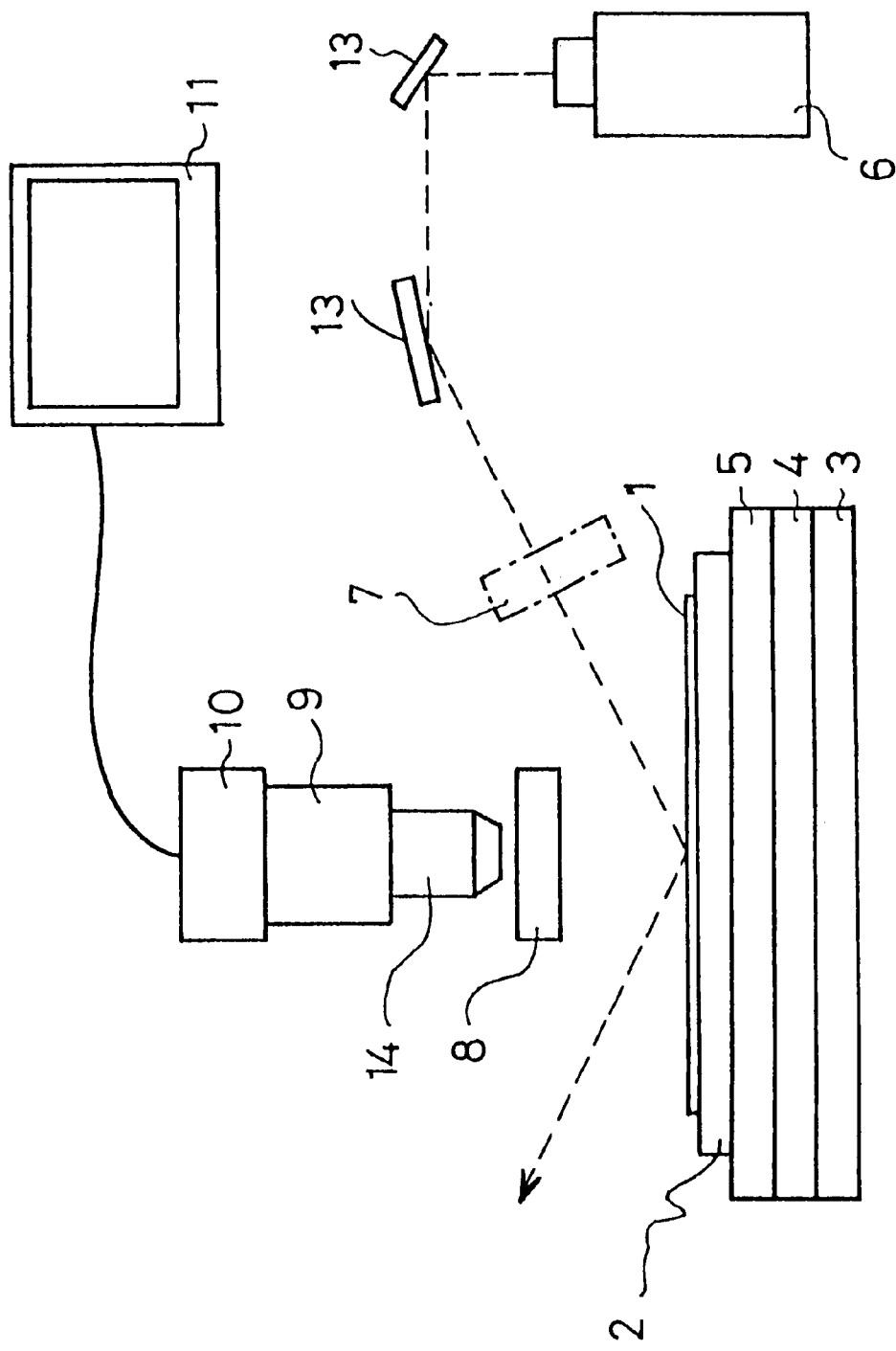
FIG. 1 is a view showing a conceptional diagram of the resent invention.

The present invention is concerned with a probe microscope for observing a sample surface geometry and state, comprising of a structure having a roughly positioning rough movement mechanism and a finely positioning slight movement mechanism which cause a sample and a mechanism for detecting physical amount such as interatomic force received from the sample to relatively, three-dimensionally move a control means for maintaining a distance between the sample and the mechanism for detecting a physical amount such as interatomic force constant, an anti-vibration mechanism for reducing transmission of vibration which comes from an installation environment to the apparatus, a control section for controlling an overall apparatus, and a computer, and having a beam light applying system for applying a beam light to a sample surface and an optical microscope system for observing the sample surface and thus having a function capable of confirming by the optical microscope system a position of foreign-matter existing on the sample surface due to the face that the applied beam light is scattered by the foreign-matter, wherein a constitution capable of incorporating a polarizing element is provided in a side of the beam light applying system or a side of the optical microscope.

In the probe microscope for observing a sample surface geometry and state having a function of confirming by the optical microscope system a position of the foreign-matter due to the fact that the applied beam light is scattered by the foreign-matter, it may have the constitution capable of incorporating a polarizing element is provided only in the side of the optical microscope.

Further, such a feature is desirable that the polarizing element incorporated in the side of the optical microscope is provided in a direction of a polarizing light nearly perpendicular to a polarizing light of the applied beam light (in a direction of S or P where the applied beam light is P or S polarizing light).

For example, the polarizing element incorporated in the side of the beam light applying system or the side of the optical microscope is provided in a direction of a polarizing light mutually, nearly perpendicular to a polarizing light of the beam light (S or P where the applied beam light is P or S polarizing light). Further, the polarizing elements incorporated in the side of the beam light applying system and the side of the optical microscope are provided in a direction of a polarizing light nearly perpendicular to each other.

Further, the polarizing element is provided immediately in front of an objective lens in the optical microscope system and behind the beam application in a side of the beam light applying system.

Further the polarizing element is provided behind an objective lens in the optical microscope system and behind the beam application in a side of the beam light applying system.

Further, an image obtained by the optical microscope system in the optical microscope system can be observed by two kinds of a CCD camera and a highly sensitive CCD camera capable of observing even with low luminosity.

Further, in the polarizing elements incorporated in the side of the beam light applying system and the side of the optical microscope, at least one or both is/are provided with a mechanism having a constitution capable of being inserted in or withdrawn from a beam light path or an optical microscope optical path.

Further, it is preferable there is provided means for conducting a beam light coming from a beam oscillator to the beam light applying system by using an optical fiber.

Further, there is provided means for conducting a beam light coming from an optical part such as a mirror.

Further, it is preferable to have a structure in which a beam light of the beam light applying system can come in with an incident angle of 30° or less with respect to the sample surface.

Embodiment

Hereinafter, it is explained about an embodiment on the basis of drawings.

Figure 2:
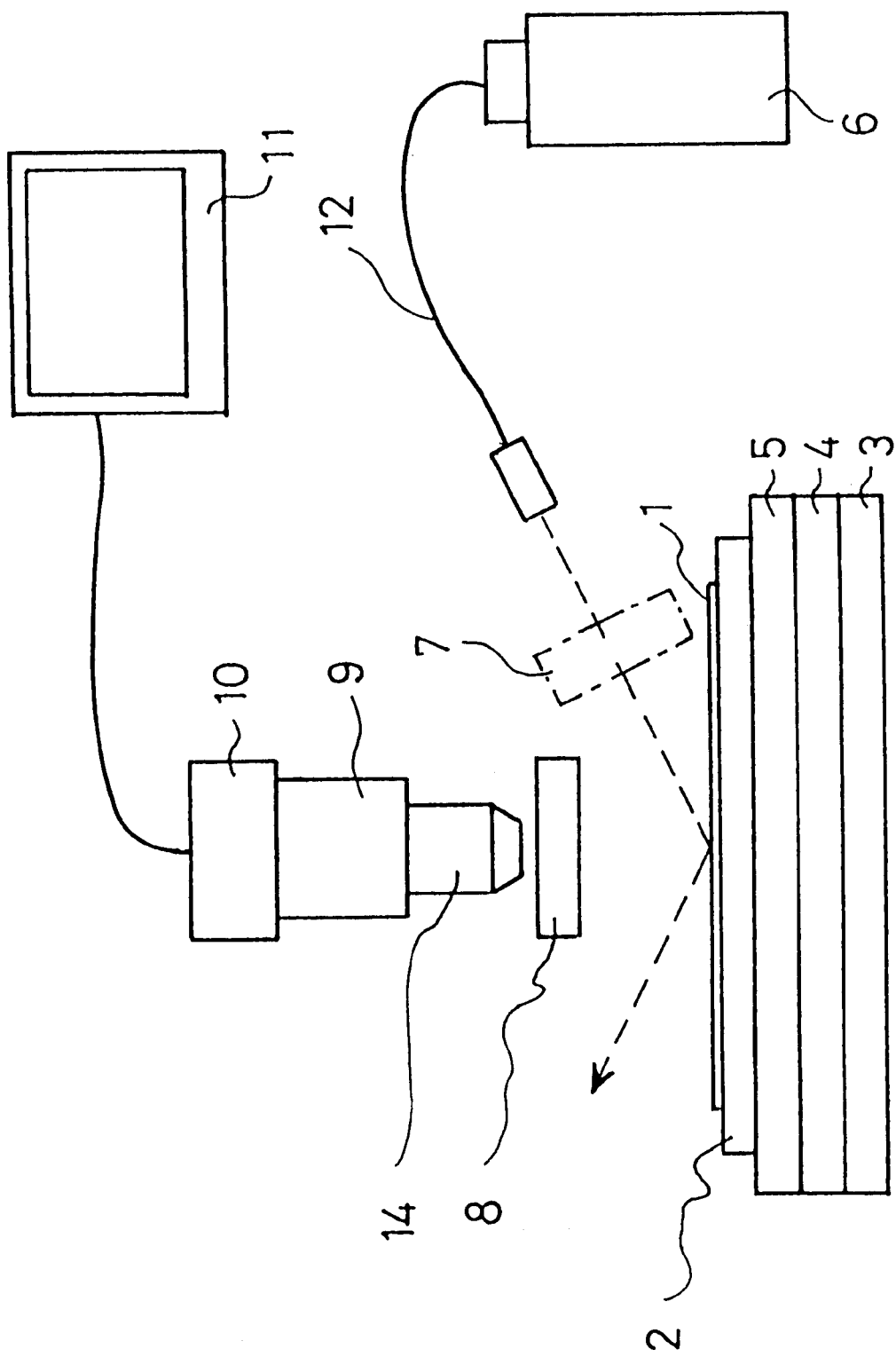
FIG. 2 is a view showing a conceptional diagram of the present invention.

FIG. 1 and FIG. 2 show conceptional diagrams of the present invention. It is adapted in such a manner that a sample 1 is mounted on three-dimensional motion stages 3, 4, 5 through a sample holder 2 and a laser light emitted from a laser oscillator 6 is applied through a polarizing element 7 or directly to a sample 1 surface, and it is so constituted that a scattered light scattered by foreign-matter on the sample 1 surface displayed on a monitor 11 through a CCD camera 10 mounted on an optical microscope 9, through a polarizing element 8 arranged in a direction perpendicular to a polarizing direction of the laser light applied to the sample. As a method of bringing a beam light to apply to the sample 1 surface, there are a method of using an optical fiber 12 and a method of using optical parts such as a mirror 13.

Further, as to an optical microscope 9 having an objective lens 14 of high magnification, in the event that a sufficient distance is not obtained between the sample 1 surface and the objective lens 14, the polarizing element 8 is arranged behind the objective lens 14 for the sake of convenience.

Figure 3:
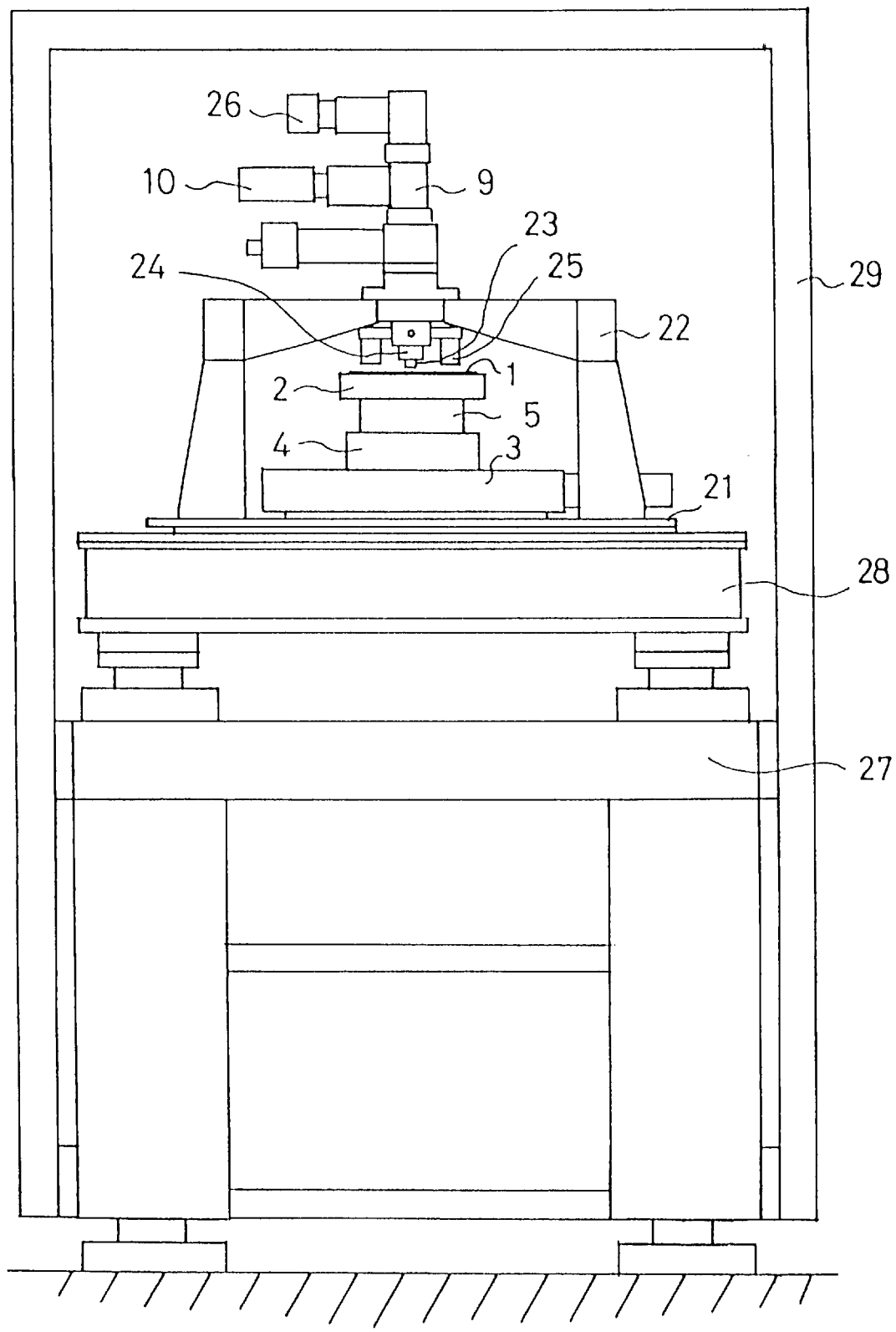
FIG. 3 is a view showing a constitution of a probe microscope until section on which there is mounted a constitution of the present invention.

FIG. 3 is a view showing a constitution of a probe microscope unit section on which there is mounted the above conceptional constitution, wherein element parts such as detecting section of the probe microscope are arranged on a surface table 21. On the surface table 21, there are fixed, as three-dimensional motion stages, an X-axis stage 3 for motion in a left-and-right direction in the drawings, i.e., in an X-axis direction, a Y-axis stage 4 for motion in a back-and-forth direction in the drawings, i.e., in a Y-axis direction, a Z-axis stage 5 for motion in a up-and-down/back-and-forth direction in the drawings, i.e., in a Z-axis direction, and a support arm 22. The sample 1 is fixed on the Z stage 5 through the sample holder 2. In case of a wafer, the sample is fixed by vacuum suction. At a position facing the sample 1, there is a detecting section 23 for detecting a surface state of the sample 1 and it is fixed on a slight movement mechanism 24. The slight movement mechanism 24 is constituted by a piezoelectric element which is deformed by applying voltage thereto and it causes the detecting section 23 to three-dimensionally move with respect to the sample 1 surface. In the present embodiment, as the detecting section 23 there is used one constituted so as to optically detect a displacement of an extremely small spring element which is deformed when it is subjected to a physical force such as interatomic force or magnetic force from the sample 1 surface. This is one obtained by miniaturizing a so-called optical lever system in which a laser light is applied to a spring element and a positional derivation of its reflected light is detected by an optical detecting element, thereby making it a displacement signal. The slight movement mechanism 24 is fixed to the support arm 22.

Further, an optical microscope 9 having several objective lenses 25 is arranged at a position in the Y-axis direction of the slight movement mechanism 24 and the objective lenses 25 are fixed on an electrically-driven revolver. This enables the optical microscope 9 to vary its magnification. The optical microscope 9 projects an image on a monitor 11 through a highly sensitive CCD camera 10 or a CCD camera 26. The two CCD cameras are adapted so as to be separately used for the intensity of light of an object to be observed. The positional deviation amount, due to the mechanical constitution (arrangement) between a sample position viewed by the optical microscope 9 and the detecting section 23, is calculated by previously measuring with the same standard sample and registering it in a system. This makes possible for the detection section 23 to detect at the same position as a position viewed by the optical microscope 9 using the three-dimensional stages 3, 4, 5. Incidentally, the basic concept of this method is described in Japanese Patent Unexamined Publication No. H3-40356.

And, the element parts stated before are all arranged directly or through an elastic member such as rubber on a surface table 28 of anti-vibration mechanism 27. The elastic member has a function of not transmitting a vibrational component of a high frequency to the probe microscope until section. Further, the element components are covered in structure by a soundproofing cover 29. The sound-proofing cover 29 has, during observation by the probe microscope, functions of reducing the noise due to external noise sound and darkening a surrounding of the optical microscope to facilitate confirmation of the scatted light.

In this embodiment there were used an argon laser light corresponding to a wavelength of 488 nm and a green laser light corresponding to 540 nm. And, the laser light was applied to a sample 1 surface by the type using the mirror parts and the type using the optical fiber. It was applied under a state that the application angle is 45°±45° in an in-plane direction with respect to a pattern line formed on the sample 1 surface. Further, the arrangement was made to allow an incident angle of about 40°–5° with respect to the sample 1 surface.

Further, the polarizing element 8 was constitutionally placed in front of the objective lens 25, and a laser light was applied to the sample 1 surface through the polarizing element 7. The polarizing elements 7, 8 were constituted in such a manner that their insertion and withdrawal could be externally controlled by using a pneumatic cylinder or a drive mechanism of electromagnetic solenoid type.

Further, as to the optical microscope 9 whose objective lens 25 has a high magnification, the polarizing element 8 was arranged behind the objective lens 25 for a convenience sake because an insufficient distance could not be obtained between the sample 1 surface and the objective lens 25.

By constituting as mentioned above, a pattern formed in a constant direction on a wafer causes a laser light to scatter in a constant polarizing direction. Accordingly, the scattered light is varied by a polarizing element, and in a certain direction it becomes minimum and almost disappears. On the contrary, the scattered light due to foreign-matter having no directionality is difficult to be influenced by a direction of the polarizing element and, therefore, the scattered light does not disappear. For this reason, it becomes possible to distinguish the foreign-matter even on the pattern. By this, it becomes easy to specify the foreign-matter existing on the pattern. And, by using a probe microscope incorporated with an optical microscope, a probe microscope observation having a high sensitivity becomes possible easily.

What is claimed is:

1. An observation system for observing a sample, comprising: a beam light applying system for projecting a beam of light onto a sample surface; observation means for receiving light reflected from the sample surface in response to application of the beam light thereto and for confirming the existence and location of foreign matter on the sample surface by observing scattering of the applied beam light by the foreign matter; and a polarizing element for polarizing light in such a manner that light scattered by a regular pattern on the sample is reduced by the polarization and light scattered by foreign matter on the sample is not reduced by the polarization.

2. An observation system according to claim 1; further comprising detecting means including a detecting element for detecting a physical characteristic of a sample under observation.

3. An observation system according to claim 2; wherein the detecting means includes means for detecting a physical characteristic of the sample by monitoring an effect on the detecting element caused by the sample surface.

4. An observation system according to claim 3; wherein the detecting element comprises a probe having a sharpened tip, and a spring element formed integral with the probe, so that an interatomic force acting between the sample surface and the sharpened tip causes displacement of the spring element.

5. An observation system according to claim 3; further comprising a positioning mechanism for causing the detecting element to undergo relative movement with respect to the sample.

6. An observation system according to claim 5; wherein the positioning mechanism includes a rough movement mechanism for causing the detecting element to undergo rough relative movement with respect to the sample and a fine movement mechanism for causing the detecting element to undergo fine relative movement with respect to the sample.

7. An observation system according to claim 6; further comprising control means for maintaining a distance between the sample and the detecting element constant and outputting a signal representing a displacement of the detecting element.

8. An observation system according to claim 7; further comprising anti-vibration means for attenuating external vibration.

9. An observation system according to claim 1; wherein the observation means comprises an optical microscope.

10. An observation system according to claim 9; wherein the polarizing element is incorporated in the optical microscope so that the optical microscope may be used to determine the existence and location of foreign matter on the sample by observing scattering of the applied beam light by the foreign matter.

11. An observation system according to claim 10; wherein the polarizing element is incorporated in the optical microscope and has a direction of polarization that is perpendicular to a polarizing light of the applied beam light so that when the applied beam light is P or S polarizing light the direction of polarization of the polarizing element is S or P, respectively.

12. An observation system according to claim 10; wherein a polarizing element is incorporated in at least one of the beam light applying system and the optical microscope and has a direction of polarization nearly perpendicular to a polarizing light of the beam light so that when the applied beam light is P polarizing light the direction of polarization of the polarizing element is P or S, respectively.

* * * * *